March 31, 1970  M. RITUMS  3,503,194
GRASS DEFLECTOR ATTACHMENT
Filed March 28, 1968  2 Sheets-Sheet 2
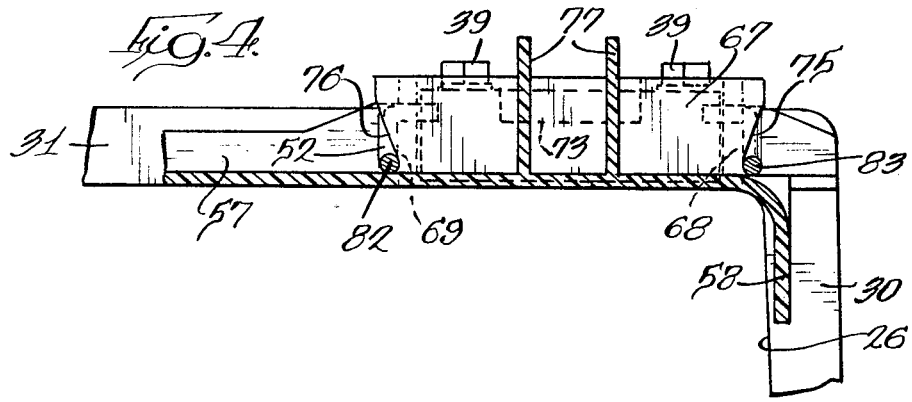
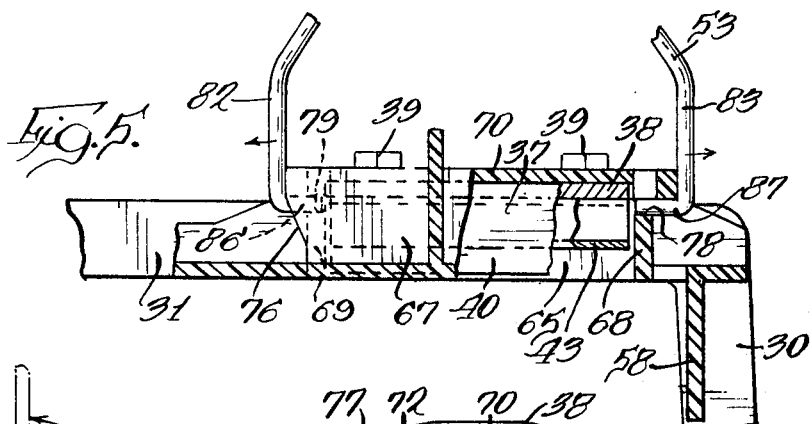
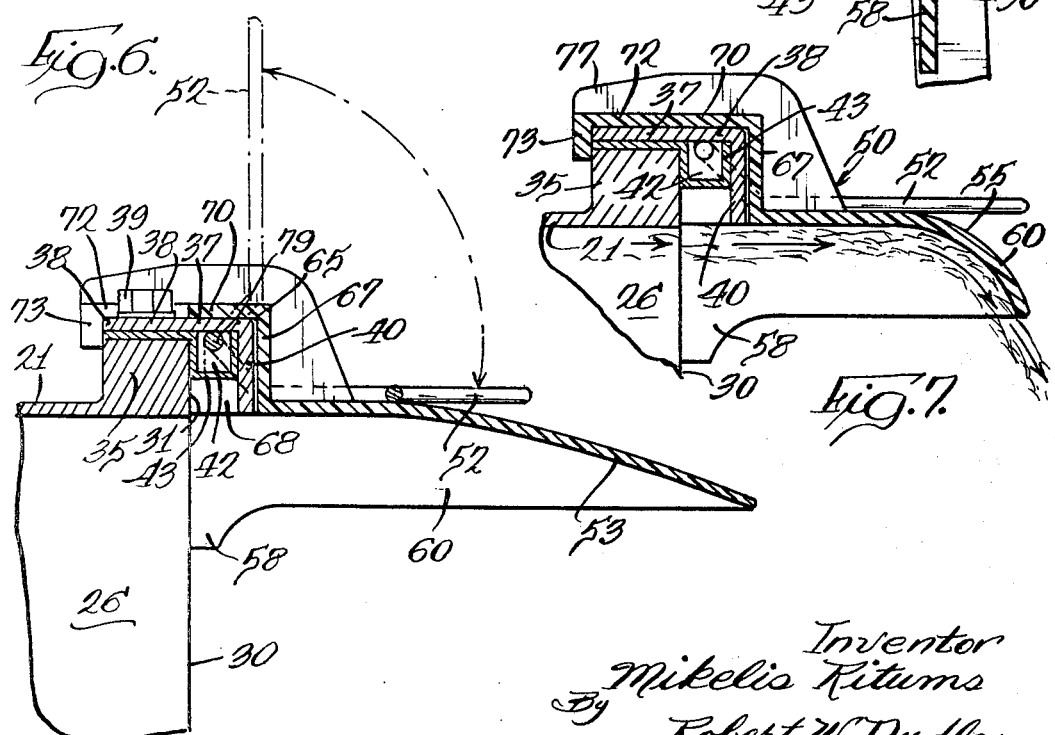
Inventor
Mikelis Ritums
By Robert W. Dudley
Atty

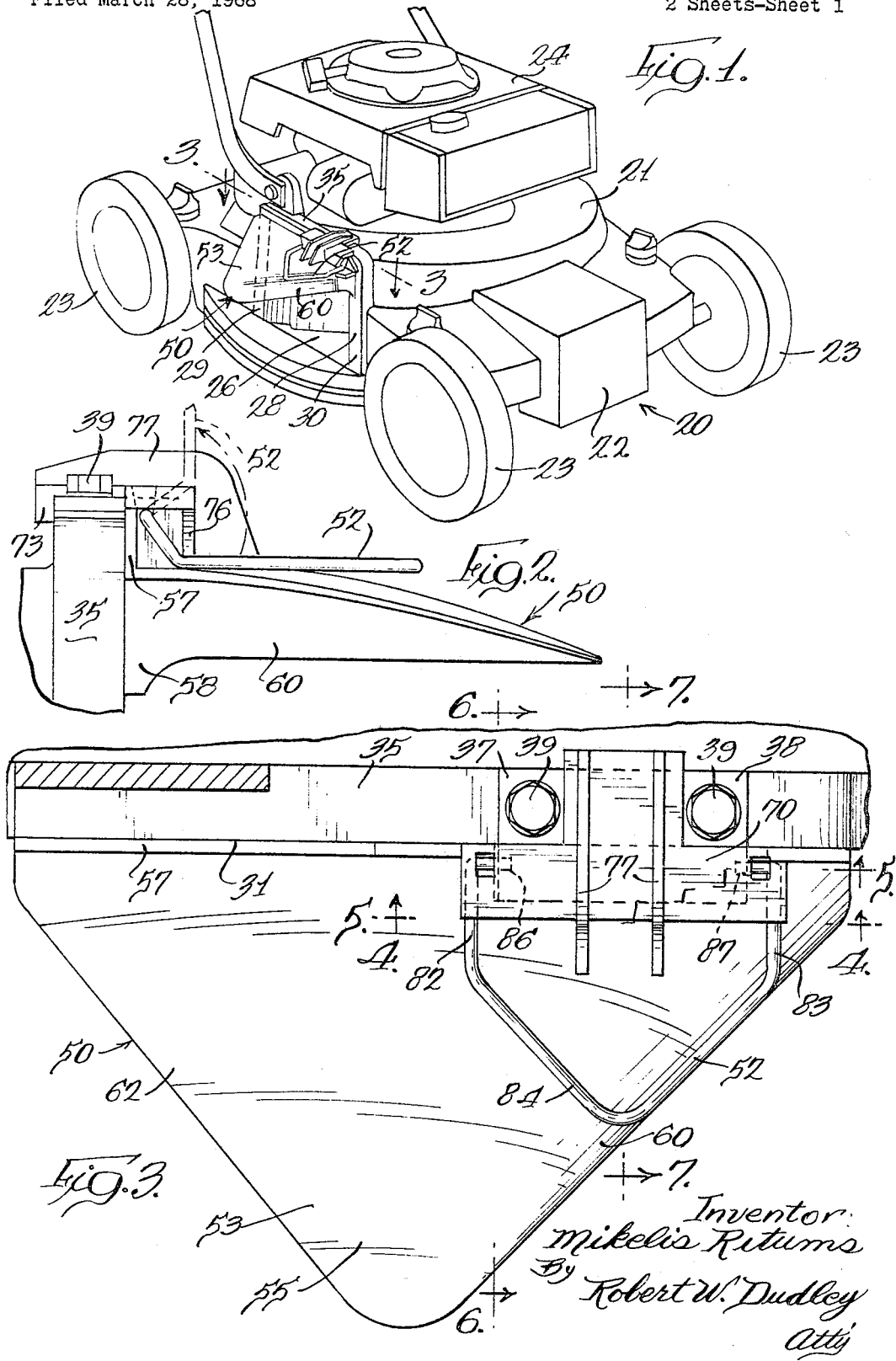

United States Patent Office 3,503,194
Patented Mar. 31, 1970

3,503,194
GRASS DEFLECTOR ATTACHMENT
Mikelis Ritums, Oak Lawn, Ill., assignor to Sunbeam Corporation, Chicago, Ill., a corporation of Illinois
Filed Mar. 28, 1968, Ser. No. 716,781
Int. Cl. A01d 55/18
U.S. Cl. 56—255                          12 Claims

ABSTRACT OF THE DISCLOSURE

A detachable grass deflector attachment which is readily securable to a rotary lawn mower above the grass discharge opening for deflecting downwardly the grass clippings and the like propelled through the discharge opening.

BACKGROUND OF THE INVENTION

The present invention relates to lawn mower attachments and, more particularly, to an improved grass deflector attachment for mounting adjacent to the discharge opening of a rotary lawn mower.

Rotary lawn mowers have gained in popularity during recent years. A rotary lawn mower normally has an inverted cup-shaped housing on which is supported an electric motor or gasoline engine for rotating a blade-type cutter in a horizontal plane within the housing. Part of the reason for the popularity of the rotary lawn mower is its ability to cut all types of grass and weeds, no matter how tall this vegetation has grown. Moreover, since the rotary lawn mower is relatively inexpensive to manufacture, its selling price is rather moderate. As the rotary lawn mower gained in popularity, there was also an increasing demand for grass bags which would be used in connection therewith. In order for the rotary lawn mower grass bags to receive and pack the clippings efficiently therein, it is necessary for the grass clippings to be propelled through the lawn mower discharge opening with considerable velocity. The efficient expulsion of clippings from the rotary lawn mower is obtained with the incorporation of fan means associated with the cutter and the designing of the lawn mower deck with aerodynamic principles for permitting the movement of a large volume of air which supports and carries the entrained clippings. A desirable rotary lawn mower deck for efficiently discharging grass clippings and the like through the discharge opening is disclosed in copending application Ser. No. 562,666, assigned to the same assignee as the present application.

With the advent of rotary lawn mowers which can hurl grass clippings and other debris through the discharge opening with high velocity so that the clippings and debris are thrown a considerable distance from the mower, there arises a problem in the use of such lawn mowers when the grass bag is not employed. There are times and conditions under which the user finds it inconvenient or undesirable to use a grass bag in connection with his rotary lawn mower. As an example, when the user has an exceptionally large area to be mowed, it may not be desirable to collect the grass in bags since much time may be consumed with transporting the filled grass bags to a place where the clippings can be stored, and considerable time may be expended in disengaging the grass bag and replacing it on the mower. Furthermore, there are lawn mower users who believe that the grass clippings are helpful to the lawn under certain weather or soil conditions providing the clippings can be evenly distributed over the lawn. Additionally, occasions arise when the user has a minimum of time to devote to lawn mowing and, consequently, decides to use the lawn mower without a grass bag.

When a rotary lawn mower which has been carefully engineered to throw grass clippings through the discharge opening with high velocity is used without a grass bag, the grass clippings are thrown a considerable distance. There are obvious disadvantages in operating a rotary lawn mower that throws the clippings a long distance since it is not desirable to have the grass clippings thrown onto flower beds, driveways, sidewalks, cultivated areas and the like. Moreover, debris, such as rocks, may be hurled from the rotary lawn mower with considerable speed and energy causing a hazardous condition if people are in the area being mowed.

In view of the above-mentioned problems, there is a need for an attachment which is quickly and easily attachable to a rotary lawn mower when the lawn mower is used without a grass bag for deflecting the grass clippings and debris downwardly so that the clippings are thrown a much shorter distance and are directed away from the lawn mower operator who is positioned immediately behind the mower. This attachment should be rigidly attachable to the lawn mower in order to withstand the rugged use to which it is exposed. Moreover, the attachment should be constructed so that it resists breakage due to the impact energy that it receives due to rocks and the like being thrown with great velocity against it. Since the attachment will prevent clippings from being thrown a great distance, it is desirable that the deflector fan out the clippings through a greater horizontal angle to effect proper dispersion of the clippings for preventing the clippings from lumping together in undesirable rows or piles. It should be appreciated that the attachment should be easily and inexpensively manufactured with a minimum number of parts and from inexpensive material.

SUMMARY OF THE INVENTION

The present invention relates to a deflector attachment for a rotary lawn mower having a grass discharge opening wherein the attachment includes a first wall which is adapted for engagement with the lawn mower adjacent to the discharge opening and locking means for releasibly securing the attachment to the mower. A second wall which is secured to the first wall extends away from and above the discharge opening, and the second wall is formed with a downwardly extending front side which forms an acute angle with the first wall whereby the grass clippings thrown from the lawn mower discharge opening are deflected downwardly and are spread through a greater horizontal angle.

Accordingly, it is an object of the present invention to provide an improved grass deflector attachment for a rotary lawn mower which is inexpensive and easily manufactured.

Another object of the present invention is to provide an improved grass deflecting attachment for a rotary lawn mower which is easily and rigidly affixed to the lawn mower.

Still a further object of the present invention is to provide an improved grass deflecting attachment for a rotary lawn mower which consists of a plastic molded part for deflecting the grass thrown from the lawn mower and a resilient spring member for assisting in locking the attachment to the lawn mower.

Further objects and advantages of the present invention will become apparent as the following specification proceeds, and the features of novelty which characterize the invention will be pointed out with particularity in the claims annexed to and forming a part of this specification.

BRIEF DESCRIPTION OF THE DRAWING

For a better understanding of the present invention, reference may be had to the accompanying drawing in which:

FIG. 1 is a perspective view of a rotary lawn mower with a grass deflector attachment embodying the present invention wherein the upper portion of the lawn mower handle is removed for convenience of illustration;

FIG. 2 is a side elevational view of the grass deflector attachment secured to a portion of the lawn mower wherein the spring member shown in full lines in its locking position a portion thereof is shown in broken lines in its release position, and the lawn mower handle support is removed;

FIG. 3 is an enlarged fragmentary view taken substantially along line 3—3 of FIG. 1;

FIG. 4 is a fragmentary sectional view taken substantially along line 4—4 of FIG. 3 assuming that FIG. 3 shows the complete structure;

FIG. 5 is a fragmentary sectional view taken substantially along line 5—5 of FIG. 3 except that the spring member is raised to release position as shown in broken lines in FIG. 2;

FIG. 6 is a fragmentary sectional view taken substantially along line 6—6 of FIG. 3 assuming that FIG. 3 shows the complete structure, and the spring member is shown in broken lines in its release position; and FIG. 7 is a fragmentary sectional view taken substantially along line 7—7 of FIG. 3, again assuming that FIG. 3 shows the complete structure.

DESCRIPTION OF THE PREFERRED EMBODIMENT

Referring now to the drawing wherein like reference characters designate corresponding parts throughout the several views, there is shown a rotary lawn mower generally designated by reference numeral 20. As illustrated in FIG. 1, the rotary lawn mower 20 includes a housing or deck 21 having a front end 22 and supported by a plurality of wheels 23. Mounted on top the housing 21 is a gasoline engine 24 which has a vertical drive shaft (not shown) supporting a blade-type cutter (not shown) in the housing for severing grass and the like and propelling the clippings through discharge opening 26. Although a gasoline engine is depicted in this embodiment, an electric motor could be just as efficiently employed. Preferably, the lawn mower 20 is constructed in accordance with the copending application, Serial No. 562,666, which is assigned to the same assignee as in the present application. The lawn mower 20 is designed to hurl grass clippings, debris and the like by fan means (not shown) through the discharge opening 26 with considerable velocity so that this material is propelled laterally and slightly rearwardly and upwardly from the lawn mower a relatively long distance. Moreover, the clippings leaving the discharge opening are dispersing or fanning out through a rather small horizonal angle. The lawn mower housing discharge opening 26 is defined by a border 28 having spaced, vertical surfaces 29 and 30 and an upper horizontal surface 31, all of which lie in a vertical plane parallel to the direction of lawn mower travel. Above the discharge opening 26 is a rim 35 to which is attached an L-shaped bracket 37 having a horizontal leg 38 which is secured to the rim 35 by a pair of bolts 39 and a vertical leg 40 which extends downwardly and is spaced from horizontal border surface 31 to define a recess 42 therebetween. A spacer 43 is positioned between the bracket 37 and the rim 35 for properly locating and retaining a suitable grass bag assembly (not shown). It should be appreciated that the majority of clippings propelled through the discharge opening 26 will pass through the opening near its front upper portion due to centrifugal force. The lawn mower 20 as depicted in FIG. 1 is designed to travel along a path parallel to the wheels 23.

In accordance with the present invention, there is provided a grass deflector attachment 50 which is readily attachable to the lawn mower 20 in order to deflect downwardly the clippings or the like propelled through the discharge opening 26. The grass deflector attachment 50 includes a somewhat U-shaped spring member 52 and a somewhat triangularly-shaped deflector 53. Preferably, the deflector 53 is molded from a suitable plastic such as polypropylene which, when molded, is resilient and flexible to reduce the likelihood of the deflector being broken or damaged by objects striking against it with considerable impact energy. As can be seen in FIGS. 2 through 7, the deflector 53 is molded to form a substantially horizontal wall 55 and a vertical, flat wall 57 having a vertical leg portion 58. When the grass deflector attachment 50 is secured to the rotary lawn mower 20, the vertical flat wall 57 abuts against the upper horizontal border surface 31 substantially across the entire discharge opening 26, and the leg portion 58 extends downwardly in contact with the vertical border surface 30 at the front of the discharge opening. The triangularly-shaped horizontal wall 55 has a downwardly curved, frontwardly facing side 60 which is angled to form an acute angle of approximately 45 degrees with respect to the vertical flat wall 57. Thus, when the lawn mower 20 is moving forwardly, the front side 60 of the horizontal wall 55 is angled to push aside objects such as bushes which might come in contact and be entangled with it. As mentioned hereinbefore, the majority of clippings propelled through the discharge opening 26 leave the opening near the upper forward portion thereof. The downwardly curved, forwardly facing side 60 is in the path of most of the clippings. The front side 60 deflects the grass clippings downwardly as depicted in FIG. 7. Additionally, since the side 60 is angled with respect to the path of the discharge clippings, the side tends to fan out and disperse the clippings which it deflects. That is to say, the angling of side 60 causes the clippings to disperse through a greater horizontal angle than if the grass deflector attachment 50 were not attached to the lawn mower 20. Therefore, the clippings are uniformly dispersed over a considerable area even though the clippings are deflected downwardly so that they cannot travel as great a distance as if the deflector attachment were not secured to the lawn mower. The horizontal wall 55 has a rearwardly facing side 62 which slopes downwardly, as can be seen in FIG. 2, to a much lesser degree than the forwardly facing side 60. The fewer clippings engaging side 62 are normally traveling at a lower velocity than the clippings contacting side 60 and, consequently, can be controlled more easily. To permit the lawn mower to manipulate freely, it is desirable to minimize the overhang which projects outboard of the wheels. Therefore, the deflector 53 is designed to effectively deflect the clippings downwardly and fan them outwardly with the front side 60, and as a result, it is only necessary for the deflector to extend outwardly from the lawn mower border 28 approximately four inches.

For the purpose of rigidly securing the grass deflector for attachment 50 to the rotary lawn mower 20, the deflector 53 is molded with a pocket 65 adapted for receiving the L-shaped bracket 37. The pocket 65 is defined a vertical wall 67, side walls 68 and 69 and a top wall 70. When the grass deflector attachment 50 is secured to the lawn mower so that the vertical flat wall 57 is abutting against the upper horizontal border surface 31 and the leg portion 58 is abutting against the vertical border surface 30, the L-shaped bracket 37 is received within the pocket 65 whereby the bracket is situated to prevent forward or rearward movement of the attachment because the side walls 68 and 69 are deposed contiguous to the ends of the brackets. To hold the attachment 50 against lateral movement, an arm 72 which is integral and coplanar with top wall 70 extends towards the lawn mower 20 and is formed at its remote end with a downwardly projecting finger hook 73 which is adapted to latch behind the rim 35 and bracket horizontal leg 38. To strengthen the top wall 70, vertical wall 67, arm 72 and finger 73 against lateral deflection, two integrally molded ribs 77 are provided. As can be seen in FIGS. 4 and 5, the vertical wall 67 is molded with opposed inclined cam surfaces 75 and 76 at its ends. Furthermore, the side walls 68 and 69 have apertures 78 and 79, respectively, which provide access into pocket 65.

Locking the deflector 53 to the rotary lawn mower 20 is the U-shaped spring member 52. Preferably spring member 52 is resilient and formed from steel wire. The spring member 52 includes spaced legs 82 and 83 with a bight portion 84 therebetween. At the end of legs 82 and 83 are inwardly extending projections 86 and 87, respectively. The legs 82 and 83 are formed and spaced so that they have to be sprung apart in order for the spring member 52 to be assembled to the deflector 53 whereby the projections 86 and 87 are biased inwardly toward each other. To assemble the spring member 52 to the deflector 53, the legs 82 and 83 are spread sufficiently for the projection 86 to enter into aperture 79 and projection 87 to enter into aperture 78. If at the time that the projections are inserted into the aperture the spring member legs 82 and 83 are extending normal to the horizontal wall 55 as illustrated in FIG. 5, then the legs 82 and 83 will contact the ends of top wall 70 preventing the projections 86 and 87 from entering into the pocket 65. However, as the spring member is rotated downwardly so that the projections 86 and 87 pivot within apertures 78 and 79, the legs 82 and 83 slide downwardly into engagement with cam surfaces 76 and 75, respectively thereby permitting the legs to bias inwardly which causes the projections 86 and 87 to move into the pocket 65 along a line parallel to the vertical flat wall 57 and the border 28. Inasmuch as the spring member legs 82 and 83 are biased inwardly, the spring member 52 is pivoted downwardly with a snapping action since the legs 82 and 83 are permitted to move inwardly along the cam surfaces 76 and 75. Once the spring member is positioned in the locking position shown in FIG. 6, there is no tendency for the spring member to move upwardly accidentally since a force is necessary to spread the legs 82 and 83 apart to permit upward movement along outwardly inclined cam surfaces 76 and 75. With the projections 86 and 87 positioned within the pocket 65 so that they are disposed against the L-shaped bracket horizontal leg 38, the grass deflector attachment 50 is prevented from moving or pivoting upwardly and, consequently, is rigidly secured to the lawn mower 20. Removal of the grass deflector attachment 50 from the rotary lawn mower 20 can be quickly and easily accomplished by simply raising the spring member 52 to the vertical position shown in FIG. 5 whereby the projections 86 and 87 move outwardly from the pocket 65 and recess 42 so that the operator can remove the attachment from the housing 21 with an upwardly or pivoting motion.

It can be readily understood that the grass deflector attachment 50 is inexpensively manufactured since it is composed of only two parts, one of which is formed from wire and the other is molded from plastic. The grass deflector attachment can be very quickly secured to or released from the lawn mower with a minimum of effort on the part of the user. Furthermore, when the attachment is locked to the lawn mower, it is in very sturdy and rigid engagement therewith and only projects laterally from the mower a short distance. Since the deflector 53 is molded from a plastic which is flexible and resilient, the likelihood of damage thereto by rocks hurled against it is greatly diminished.

While there has been illustrated and described a particular embodiment of the present invention, it will be understood that changes and modifications may occur to those skilled in the art, and it is, therefore, contemplated by the appended claims to cover all such changes and modifications as fall within the true spirit and scope of the present invention.

What is considered new and desired to be secured by Letters Patent of the United States is:

1. A deflector attachment for a rotary lawn mower having means defining a lateral grass discharge opening through which grass clippings are propelled outwardly through a given horizontal dispersion angle comprising a first wall adapted to engage with the lawn mower means adjacent to the discharge opening, means releasably locking said wall to the lawn mower means, a second wall being secured to said first wall and extending away from the lawn mower above the grass discharge opening, said second wall being a downwardly extending front side which forms an acute angle with said first wall whereby grass clippings egressing from the lawn mower grass discharge opening engaging said second wall are deflected downwardly and are deflected through a greater horizontal angle.

2. The deflector attachment of claim 1 wherein said first and second walls being integrally molded forming a unitary part which is flexible.

3. The deflector attachment of claim 1 wherein said second wall front side being angled across the path of grass discharge opening when said attachment is secured to the lawn mower.

4. The deflector attachment of claim 3 wherein said first wall extending vertically and said second wall extending substantially horizontally.

5. The deflector attachment of claim 1 wherein said releasably locking means comprising a spring member pivotally mounted, cam means formed integrally with said first wall and disposed for engagement with said member whereby the pivoting of said spring member causes said cam means to move said member into locking relationship with the lawn mower.

6. The deflector attachment of claim 5 wherein said spring member being approximately U-shaped with a pair of projections extending parallel with said first wall whereby pivotal movement of said spring member causes said projections to move parallel to said first wall.

7. A deflector attachment for use with a rotary lawn mower having a lateral grass discharge opening and recess means adjacent to the opening wherein the improvement comprises wall means including a first wall portion contiguous to the lawn mower discharge opening, said wall means including a second wall portion extending away from the discharge opening and disposed for deflecting the grass clippings egressing therefrom, said wall means defining cam means, a spring member being pivotally mounted to said wall means and positioned for engaging said cam means, said spring member being provided with projection means disposed for movement parallel to said first wall portion upon pivoting of said member due to said member being in engagement with said cam means whereby the pivotal movement of said member causes said projection means to enter into the lawn mower recess means in locking relationship.

8. The deflector attachment of claim 7 wherein said spring member having a substantially U-shaped configuration with two spaced legs and inwardly directed opposed end projections, said cam means including two spaced cam surfaces, said spaced legs being in engagement with said cam surfaces so that the pivotal movement of said legs causes said end projections to move toward and away from each other, said end projections being adapted for receiving the lawn mower recess means therebetween.

9. The deflector attachment of claim 7 wherein said first wall portion being disposed for engaging the lawn mower above the grass discharge opening and extending thereacross, said first wall portion being disposed for engaging the lawn mower along the side of the grass discharge opening.

10. The deflector attachment of claim 7 wherein said wall means defining a pocket framed by a horizontal and vertical surface, said projection means being extendable into said pocket for entering into the lawn mower recess means, said horizontal and vertical surfaces adapted for engagement with the lawn mower for preventing movement of said attachment with respect to the lawn mower when said projection means are inserted into the lawn mower recess means.

11. The deflector attachment of claim 10 wherein said wall means being integrally molded of plastic material and being flexible.

12. The deflector attachment of claim 11 wherein said wall means including a hook-shaped arm adapted for engagement with the lawn mower above and inwardly from the grass discharge opening.

References Cited

UNITED STATES PATENTS

| | | | |
|---|---|---|---|
| 2,708,334 | 5/1955 | Coners | 56—25.4 |
| 2,756,556 | 7/1956 | Watkins | 56—189 |
| 3,391,524 | 7/1968 | Nickoloff et al. | 56—25.4 |
| 3,420,041 | 1/1969 | Irgens | 56—25.4 |
| 3,423,918 | 1/1969 | Siwek | 56—202 |

RUSSELL R. KINSEY, Primary Examiner

U.S. Cl. X.R.

56—25.4